(12) United States Patent
Rhine et al.

(10) Patent No.: US 7,074,880 B2
(45) Date of Patent: Jul. 11, 2006

(54) POLYIMIDE AEROGELS, CARBON AEROGELS, AND METAL CARBIDE AEROGELS AND METHODS OF MAKING SAME

(75) Inventors: Wendell Rhine, Belmont, MA (US); Jing Wang, Amherst, MA (US); Redouane Begag, Hudson, MA (US)

(73) Assignee: Aspen Aerogels, Inc., Marlborough, MA (US)

( * ) Notice: Subject to any disclaimer, the term of this patent is extended or adjusted under 35 U.S.C. 154(b) by 0 days.

(21) Appl. No.: 10/625,501

(22) Filed: Jul. 22, 2003

(65) Prior Publication Data

US 2004/0132845 A1    Jul. 8, 2004

Related U.S. Application Data

(60) Provisional application No. 60/397,894, filed on Jul. 22, 2002.

(51) Int. Cl.
| | |
|---|---|
| C08G 69/26 | (2006.01) |
| C08G 73/10 | (2006.01) |
| C01B 31/02 | (2006.01) |
| H01B 1/04 | (2006.01) |
| C08J 9/00 | (2006.01) |
| C08U 9/12 | (2006.01) |

(52) U.S. Cl. ............... 528/310; 528/125; 528/126; 528/128; 528/172; 528/173; 528/174; 528/176; 528/179; 528/185; 528/188; 528/220; 528/229; 528/342; 528/348; 528/351; 528/353; 521/82; 521/88; 521/117; 521/183; 521/184; 521/185; 252/502; 252/503; 429/44; 525/420; 525/422; 502/180; 502/182; 423/349; 423/439; 423/445 R; 428/473.5

(58) Field of Classification Search ........ 528/170, 528/353; 521/82, 88, 117, 183, 184, 185; 252/502–503; 429/44; 502/180, 182; 423/349, 423/439, 445 R; 428/473.5
See application file for complete search history.

(56) References Cited

U.S. PATENT DOCUMENTS

| | | | |
|---|---|---|---|
| 4,474,662 A | * | 10/1984 | Makino et al. ........ 210/500.39 |
| 4,606,955 A | * | 8/1986 | Eastman et al. ............ 428/35.7 |
| 4,898,753 A | * | 2/1990 | Inoue et al. ................ 427/276 |
| 4,997,804 A | | 3/1991 | Pekala |
| 5,231,162 A | * | 7/1993 | Nagata ........................ 528/353 |
| 5,234,966 A | * | 8/1993 | Barringer et al. ............ 521/117 |
| 5,260,855 A | | 11/1993 | Kaschmitter et al. |
| 5,284,519 A | | 2/1994 | Gadgil |
| 5,358,802 A | | 10/1994 | Mayer et al. |
| 5,376,209 A | | 12/1994 | Stoakley et al. |
| 5,502,156 A | | 3/1996 | St. Clair et al. |
| 5,520,960 A | | 5/1996 | Rancourt et al. |
| 5,575,955 A | | 11/1996 | Caplan et al. |
| 5,601,938 A | | 2/1997 | Mayer et al. |
| 5,677,418 A | | 10/1997 | Thompson et al. .......... 528/353 |
| 5,859,171 A | * | 1/1999 | Sawasaki et al. ............ 528/183 |
| 6,332,990 B1 | | 12/2001 | Mayer et al. |
| 6,399,669 B1 | * | 6/2002 | Suzuki et al. ................ 521/183 |
| 6,451,965 B1 | * | 9/2002 | Kanada et al. ............... 528/480 |
| 6,544,648 B1 | | 4/2003 | Nesbitt et al. |
| 6,586,081 B1 | * | 7/2003 | Nishinaka et al. .......... 428/209 |
| 6,726,962 B1 | * | 4/2004 | Loszewski ............... 427/443.2 |

FOREIGN PATENT DOCUMENTS

| | | |
|---|---|---|
| EP | 0 987 294 A1 | 9/1999 |
| WO | WO 02/052086 A2 | 7/2002 |
| WO | WO 2004/009673 A1 * | 1/2004 |

OTHER PUBLICATIONS

Siyu Ye, et al., "A New Electrocatalyst Consisting of a Molecularly Homogeneous Platinum-Aerogel Nanocomposite", Can. J. Chem., 75 (1997) 1666.

Elena Bekyarova and Katsumi Kaneko, "Structure and Physical Properties of Tailor-Made Ce, Zr-Doped Carbon Aerogels", Advanced Materials, 12, [21] (2000) 1625.

R. W. Pekala, et al., "Carbon Aerogels for Electrochemical Applications", Journal of Non-Crystalline Solids, 225 (1998), 74.

R. Petricevic, et al., "Planar fiber reinforced carbon aerogels for application in PEM fuel cells", Carbon, 39 (2001) 857.

Siyu Ye, et al., "A new fuel cell electrocatalyst based on carbonized polyacrylonitrile foam", J. Electrochem. Soc., 144, [1], (1997) 90.

J. Wang, et al., "Carbon cloth reinforced carbon aerogel films derived from resorcinol formaldehyde", J. Porous Materials, 8 (2001) 159.

J. Wang, et al., "Electrical Transport Properties of Carbon Aerogels ", J. of Porous Materials, 8 (2001) 167.

Y. Hanzawa, et al., "Activated carbon aerogels", Langmuir, 12, [26], (1996) 6167.

(Continued)

Primary Examiner—P. Hampton Hightower
(74) Attorney, Agent, or Firm—David G. Conlin; John B. Alexander; Edwards Angell Palmer & Dodge LLP (57) ABSTRACT

A preparation process of polyimide aerogels that composed of aromatic dianhydrides and aromatic diamines or a combined aromatic and aliphatic diamines is described. Also descried is a process to produce carbon aerogels derived from polyimide aerogel composed of a rigid aromatic diamine and an aromatic dianhydride. Finally, the processes to produce carbon aerogels or xerogel-aerogel hybrid, both of which impregnated with highly dispersed transition metal clusters, and metal carbide aerogels, deriving from the polyimide aerogels composed of a rigid aromatic diamine and an aromatic dianhydride, are described. The polyimide aerogels and the polyimide aerogel derivatives consist of interconnecting mesopores with average pore size at 10 to 30 nm and a mono-dispersed pore size distribution. The gel density could be as low as 0.008 g/cc and accessible surface area as high as 1300 $m^2/g$.

43 Claims, 4 Drawing Sheets

OTHER PUBLICATIONS

J. M. Miller and B. Dunn, "Morphology and electrochemistry of ruthenium/carbon aerogel nanostructures", Langmuir, 15 (1999) 799, month not available.

G. Biesmans, et al., "Polyurethane based organic aerogels and their transformation into carbon aerogels", Journal of Non-Crystalline Solids, 225, (1998) 64, month not available.

R. Saliger, et al., "High surface area carbon aerogels for supercapacitors", Journal of Non-Crystalline Solids, 225 (1998) 81, month not available.

Alexander E. Gash, et al., "New Sol-gel Synthetic Route to Transition and Main-group Metal Oxide Aerogels Using Inorganic Salt Precursors", Journal of Non-Crystalline Solids, 285 (2001), 22, month not available.

M. Glora, et al., "Integration of Carbon Aerogels in PEM Fuel Cells," J. Mon-Cryst. Solids, 285 (2001) 283, month not available.

F.J. Maldonado-Hodar, et al., "Synthesis and textural characteristics of organic aerogels, transition-metal-containing organic aerogels and their carbonized derivatives," Carbon, 37 (1999) 1199, month not available.

E. Frackowiak and F. Beguin, "Carbon materials for the electrochemical storage of energy in capacitors," Carbon, 39 (2001) 937, month not available.

V. Bock, et al., "Influence of Monomer and Catalyst Concentration on RF and Carbon Aerogel Structure", Journal of Non-Crystalline Solids, 225 (1998), 69, month not available.

* cited by examiner

Figure 1

ASP-9

POLYIMIDE AEROGELS, CARBON AEROGELS, AND METAL CARBIDE AEROGELS AND METHODS OF MAKING SAME

This application claims the benefit of Provisional Application No. 60/397,894, filed Jul. 22, 2002.

BACKGROUND OF INVENTION

1. Field of the Invention

The present invention relates to a sol-gel process for the preparation of aromatic polyimide aerogels, carbon aerogels, metal carbide aerogels which possess high surface area, uniform pore size, and narrow pore size distribution. The present invention also relates to aromatic polyimide aerogels, carbon aerogels, metal carbide aerogels of the invention having one or more metals dispersed therein. The present invention further provides processes for producing carbon aerogels and carbon aerogel derivatives from the polyimide aerogels of the invention such that the resultant carbon aerogels retain the interconnecting pore morphology of polyimide aerogel with high surface area, average pore size at 10 to 30 nm, and narrow pore size distribution.

2. Description of the Related Art

Aerogels are solid materials that consist of a highly porous network of micro-sized and meso-sized pores. The pores of an aerogel can frequently account for over 90% of the volume when the density of the aerogel about 0.05 gram/cc. Aerogels are generally prepared by a supercritical drying technique to remove the solvent from a gel (a solid network that encapsulates its solvent) such that no solvent evaporation can occur and consequently no contraction of the gel can be brought by capillary forces at its surface. Therefore, aerogel preparation through a sol-gel process proceeds in 3 steps: dissolution of the solute in a solvent, formation of the sol, formation of the gel, and solvent removal by either supercritical drying technique or any other method that removes solvent from the gel without causing pore collapse.

Typically, the synthesis of polyimide gels at very low solute concentration is the first step in the preparation of polyimide aerogels. Precursor poly(amic acids) are imidized in solution at elevated temperatures, some polyimides will gel as the reaction solution is quenched from the high reaction temperature to ambient temperature. However, solution imidization at elevated temperatures is accompanied by hydration leading to depolymerization of the poly (amic acids) and results in a weakened gel. Such gels do not have sufficient mechanical strength to yield low-density polyimide aerogels. It has been reported that chemical imidization of some poly(amic acids) at a solute concentration above 10–15% (wt./wt.) produces gels probably induced by intermolecular cross-linking. Such gels are mechanically weak and the high solute concentrations are not feasible for producing a low-density aerogel.

The commonly used organic precursors for carbon aerogels are resorcinol-formaldehyde (RF), polyacrylonitrile (PAN), and polyurethane. Although mesopores of carbon aerogels are very uniform, there are always a small percentage of micro-pores. For example, carbon aerogels prepared from RF aerogel are mesoporous materials with high surface areas. About 20 to 25% of micropores is formed during the pyrolysis of RF aerogel. When the carbon aerogel is used as catalyst support, the micropores impose a strong barrier for the mass transport of liquid components in or out of the pore. As a result, the catalysts in the micropores are severely underutilized.

Transition metal catalysts, such as platinum, nickel, cobalt, iron, and chromium, can easily be incorporated into the carbon aerogels by dissolving the corresponding soluble metallic compound precursors in the organic reaction solution before gelation occurs. The transition metal precursor compound is co-gelled with the organic gel or the precursor metal compound is precipitated onto the organic gel during or after the formation of the organic gel but before solvent removal, such that the molecular clusters of transition metal catalysts are uniformly distributed in the carbon matrix after pyrolysis of the organic aerogels.

Transition metal carbides are characterized by high melting points, hardness, and resistance to corrosion. Monolithic metallic carbides are traditionally prepared by hot pressing a metal carbide powder or hot pressing a powder mixture of carbon and a metal oxide compound under high pressure and temperatures above 1600° C. One method for preparing metal carbide aerogels in the form of a low density monolith comprises a uniform mixing of carbon and a metal at a molecular or colloidal level and pyrolyzing the mixture under conditions conducive to reaction of the metal and carbon to form a metal carbide during the pyrolysis process.

An efficient, inexpensive, and straightforward route to synthesize transition and main-group metal oxide aerogels have been reported by Alexander E. Gash, etc. in Journal of Non-Crystalline Solids 285 (2001), 22. In this approach, the epoxides are used as gelation agents for the metal oxide aerogel synthesis from simple metal ion salts. This methodology is modified in the present invention to produce interpenetrating network of metal oxide and polyimide aerogels.

Considerable effort has been devoted to the development and characterization of new electrode materials with improved performance for applications in energy storage devices such as electrochemical supercapacitors. Supercapacitors are unique devices exhibiting 20 to 200 times greater capacitance than conventional capacitors mainly due to the high surface area of the electrodes used or to highly functionalized surfaces. The large capacitance exhibited by these systems arises from double layer (DL) capacitance (i.e., from charge separation across the electrode/electrolyte interfacial DL) often in combination with pseudocapacitance. This pseudocapacitance is associated with redox-type reactions due to the presence of surface chemical groups and/or to participation of adsorbed species on its surface.

Carbon aerogels have been incorporated into electrodes in various electrochemical applications. U.S. Pat. No. 6,332, 990 recites composite carbon thin film sheets which are used as electrodes in a variety of electrochemical energy storage applications wherein the carbon thin film sheet comprises a carbon aerogel as a binder. U.S. Pat. No. 5,358,802 teaches phosphoric acid doped carbon aerogels and the use of same as electrolytes in secondary lithium ion batteries. U.S. Pat. No. 5,601,938 recites membrane electrode assemblies for fuel cell application in which the gas diffusion layer comprises a carbon aerogel having transition metals and phosphoric acid deposited thereon. U.S. Pat. No. 6,544,648 recites new amorphous carbon materials which have been consolidated under elevated temperature and pressure and the use of such materials in electrochemical and structural applications.

U.S. Pat. No. 5,260,855, issued to Kaschmitter, recites a series of carbon foam electrodes which are prepared by pyrolysis of resorcinol-formaldehyde and related polymers. Kaschmitter teaches the use of such carbon foams as electrodes in capacitors.

It would be desirable to provide polyimide aerogels from aromatic dianhydrides and diamine monomers such as aromatic diamines or a mixture of at least one aromatic diamine monomer and at least one aliphatic diamine monomer such that the polyimide aerogel possesses low density, mesopores, narrow pore size distribution and good mechanical strength. It would also be desirable to provide carbon aerogels having a surface area in excess of about 800 m$^2$/gram or more preferably in excess of about 1000 m$^2$/gram, while substantially or completely excluding micro-pores from the aerogel. It would further be desirable to provide carbon aerogels, carbon xerogel-aerogel hybrids, transition metal carbide aerogels and transition metal carbide-carbon hybrid aerogels possessing high surface areas, which may optionally be impregnated with highly dispersed transition metal clusters or particles.

SUMMARY OF THE INVENTION

The present invention provides processes for the production of polyimide aerogels comprising synthesis of a polyimide gel and drying the gel by supercritical $CO_2$. The present invention also provides carbon aerogels which are prepared from polyimide aerogels of the invention by pyrolysis in an inert atmosphere. The present invention further provides processes to produce carbon aerogels and xerogel-aerogel hybrid materials which are impregnated with highly dispersed transition metal particles or clusters, transition metal carbide aerogels, and transition metal carbide-carbon hybrid aerogels. The present invention also provides transition metallic compounds/polyimide aerogel or xerogel-aerogel hybrid prepared through a sol-gel process, comprising synthesis of a polyimide precursor solution, in-situ incorporation of transition metallic compounds in the polyimide gel, and drying the gel by supercritical $CO_2$. The metal/carbon aerogel composite, metal carbide aerogels, or metal carbide-carbon hybrid aerogels of the invention are typically prepared by the methods which are also provided by the present invention.

The present invention provides several processes to produce carbon aerogels or carbon xerogel-aerogel hybrids each of which may optionally be impregnated with highly dispersed transition metal particles, and metal carbide aerogels. More particularly, the present invention relates to the in-situ incorporation of soluble metallic salts to the polyimide precursor solution during the sol-gel process to produce highly dispersed metal compounds or metallic particles in the polyimide aerogel. Even more particularly, one of the processes in the present invention relates to the formation of interpenetrating networks of metal oxide and polyimide gels in the sol-gel process to produce metal oxide/polyimide aerogel composites. Finally, most particularly, the pyrolysis of the metal oxide/polyimide aerogel composite in an inert atmosphere yields carbon aerogels or carbon xerogel-aerogel hybrids impregnated with highly dispersed transition metal particles, or metal carbide aerogels or metal carbide-carbon hybrid aerogels, wherein depending on the metallic compound and composition of the aerogels.

The carbonized aerogels are obtained by pyrolysis of polyimide as well as polyimide derivative aerogels in an inert atmosphere at temperatures ranging from about 500° C. to about 2000° C., more preferably from about 600° C. to about 1600° C. Typically preferred pyrolysis temperatures include about 600° C., 650° C., 700° C., 750° C., 800° C., 850° C., 900° C., 950° C., 1000° C., 1050° C., 1100° C., 1150° C., or about 1200° C.

Carbon aerogels of the presnt invention typically comprise a mixture of carbon and nitrogen where the concentration of nitrogen in the aerogel is inversely proportional to the pyrolysis temperature used to carbonize the precursor polyimide aerogel. Although not wishing to be bound by theory, applicants believe that nitrogen present in the imide functional group of the polyimide is incorporated into the carbon aerogel during pyrolysis. Thus, at higher temperatures, more nitrogen is released thereby reducing the content of nitrogen in the carbon aerogel. Applicants have surprisingly discovered that nitrogen doped carbon aerogels produced by pyrolysis of polyimide aerogels possess superior physical and electrical properties compared to aerogels prepared from hydrocarbon or oxygenated hydrocarbon polymer aerogels such as resorcinol-formaldehyde type aerogels.

The present invention provides polyimide aerogels suitable for insulation materials with service temperatures ranging from cryogenic temperature, e.g., about 3–4K, about 77K, or the like up to about 500° C., where the temperature range frequently depends upon the polyimide composition, the mechanical properties of the polyimide aerogel, and the dielectric constant of the polyimide aerogel.

The invention also provides carbon aerogels preferably carbon aerogels comprising between about 0.01% and about 15% nitrogen by weight, which are suitable for use as high temperature insulating materials with service temperatures of up to at least about 500° C., about 1000° C. or about 1500° C. in inert atmospheres.

The sol gel processes of preparing polyimide aerogels and related carbon based aerogels may be used in combination with one or more other sol gel processes, such as silica, zirconia, hafnia, or alumina sol gel processes, to prepare silica-polyimide, zirconia-polyimide, hafnia-polyimide, or alumina-polyimide hybrid aerogel materials.

In another aspect, the derived mesoporous carbon aerogels from polyimide aerogels are suitable to be used as electrodes in fuel cells, rechargeable batteries, high energy density capacitors, supercapacitors, or are used as catalysts or catalyst supports or used in capacitive deionization cells.

In yet another aspect, the present invention provides mesoporous carbon aerogels, or xerogel-aerogel hybrid, impregnated with highly dispersed transition metal particles. The transition metal on carbon aerogels of the present invention are suitable for use as a catalyst in any process catalyzed by a supported metal catalyst. Non-limiting examples include processes catalyzed by transition metal catalysts supported on a metal oxide such as alumina, silica and the like, transition metal catalysts supported on amorphous carbon, transition metal catalysts supported on zeolites and other support media. The transition metal on carbon aerogels of the invention typically exhibit catalytic activities which are similar to or in excess of other traditional supported transition metal catalysts.

The present invention also provides metal carbide aerogels suitable to be used as electrode material for electrochemical devices and as high temperature insulation materials up to at least 1000° C. and greater than 2000° C. in inert atmosphers.

BRIEF DESCRIPTION OF THE DRAWING

The merit of this invention will be better understood by reference to the following drawings.

DETAILED DESCRIPTION OF THE INVENTION

The present invention provides processes for the preparation of polyimide aerogels with surface area greater than about 400 $m^2$/cc, an average pore size of between about 5 and about 100 nm, and a narrow pore size distribution. Also provided are processes for producing carbon aerogels, transition metal carbide aerogels and transition metal carbide-carbon hybrid aerogels from polyimide aerogel precursors of the invention. The present invention further provides polyimide aerogels, carbon aerogels, nitrogen doped carbon aerogels, transition metal carbide aerogels and transition metal carbide-carbon hybrid aerogels prepared by the methods of aerogel preparation disclosed herein.

The present invention provides processes for producing polyimide aerogels. The processes of the invention typically comprise the steps of:

contacting a diamine monomer and an aromatic dianhydride monomer in a solvent under conditions conducive to formation of a poly(amic acid);

contacting the poly(amic acid) in a first solvent with a dehydrating agent to form a polyimide gel by imidization; and drying the polyimide gel in the presence of supercritical $CO_2$ to afford an polyimide aerogel.

Typically the polymerization and/or imidization reaction solvent is replaced with supercritical carbon dioxide prior to drying the gel. For reaction solvents which are miscible with carbon dioxide, the reaction solvent is extracted directly from the gel with supercritical carbon dioxide. For those reaction solvents which are not miscible with supercritical carbon dioxide, one or more preliminary solvent exchanges are carried out to replace the reaction solvent with a solvent in which supercritical carbon dioxide is miscible followed by exchange with supercritical carbon dioxide.

Preferably, processes of producing polyimide aerogels in which the first solvent is not miscible with supercritical $CO_2$, the method further comprises the step of exchanging the first solvent with a second solvent which is miscible with supercritical $CO_2$ prior to drying the polyimide gel.

More preferably, the first solvent is not miscible with $CO_2$ and the second solvent is miscible with the first solvent. Preferred first solvents include polar organic solvents including amides, sulfones, and ethers. Particularly preferred solvents include N-methyl-2-pyrrolidinone (NMP), N,N-dimethylacetamide (DMAc), N,N-dimethyl formamide (DMF), and mixtures of NMP and tetrahydrofuran (THF) are suitable for prepararation of the polyimide for making the polyimide precursor. Typically preferred second solvents include solvents which are miscible with supercritical $CO_2$. Preferred non-limiting examples of second solvents include alcohols such as methanol and ethanol, toluene, acetone, ethers such as tetrahydrofuran, and aliphatic hydrocarbons such as cyclohexane and methylcyclohexane.

For processes of polyimide aerogel formation comprising a first solvent selected from NMP or the like, a solvent exchange step is necessary because first solvents such as NMP are immiscible, with supercritical $CO_2$. The first solvent in the polyimide gels is exchanged with a second organic solvent, such as ethanol, acetone, tetrahydrofuran (THF), toluene, cyclohexane or a combination of the above solvents that are miscible with $CO_2$ before being dried by supercritical $CO_2$.

In other preferred methods of making polyimide aerogels provided by the present invention, the methods include at least one post-cure step in which the polyimide aerogel is subjected to elevated temperature. Typically preferred post-cure steps include those in which the polyimide aerogel is heated at a temperature of between about 50° C. and about 450° C. Typically preferred post-cure steps may be performed before or after the supercritical $CO_2$ drying step where the post cure step takes between 30 seconds and about 2 hours. More preferably, the post cure step takes between about 1 and about 60 minutes. In methods comprising a post-curing step carried out prior to solvent removal, typically the post-cure step is carried out under a pressure of 20 psi to about 4000 psi. In methods comprising a post-cure step carried out after supercritical $CO_2$ drying, typically the post-cure step is carried out under an inert atmosphere or under vacuum.

Preferred methods of making polyimide aerogels comprise contacting an aromatic dianhydride monomer with one or more diamine monomers wherein the diamine monomer is selected from an aliphatic diamine, an aromatic diamine, a bis($\omega$-aminoalkyl)terminated polysiloxane or a combination thereof. More preferred methods of the invention comprise an aromatic diamine optionally in combination with one or more additional diamine monomers selected from an aliphatic diamine, a bis(3-aminopropyl) terminated polysiloxane, an aromatic triamine, and an aromatic tetraamine.

Preferred aromatic dianhydride monomers suitable for use in the methods of making polyimide aerogels of the present invention include those aromatic dianhydrides having between 6 and about 24 carbon atoms and between 1 and about 4 aromatic rings which may be fused, coupled by biaryl bonds, or linked by one or more linking groups selected from $C_{1-6}$ alkylene, oxygen, sulfur, keto, sulfoxide, sulfone and the like. Particularly preferred aromatic dianhydride monomers, which are suitable for use in the present invention, include pyromellitic dianhydride, 3, 3' 4, 4'-biphenyltetracarboxylic dianhydride, 3, 3' 4, 4'-benzophenone tetracarboxylic dianhydride, 2,3,6,7-naphthylene tetracarboxylic acid dianhydride, and combinations thereof.

The methods of the present invention for making polyimide aerogels comprise a two step polymerization process which may be carried out in situ or as two discrete chemical transformations. In preferred embodiments, the diamine monomer(s) and aromatic dianhydride monomer(s) are contacted under conditions conducive to formation of a poly (amic acid) polymer intermediate. Contacting the intermediate poly(amic acid) polymer with a dehydrating agent results in polyimide formation. Any dehydrating agent suitable for use in formation of an imide ring from an amic acid precursor is suitable for use in the methods of the present invention. Typically preferred dehydrating agents include chemical dehydrating agent. Preferred dehydrating agents comprise at least one compound selected from the group consisting of acetic anhydride, propionic anhydride, n-butyric anhydride, benzoic anhydride, trifluoroacetic anhydride, and phosphous trichloride. More preferably, the dehydrating agent further comprises an organic base.

The mechanical properties of polyimide aerogels, which are prepared from one or more aromatic diahydride monomers and one or more diamine monomers by the methods of the present invention, may be modified by varying the composition and relative concentration of diamine monomers and aromatic dianhydride monomers which constitute the polyimide. Moreover, varying the relative concentration of the diamine monomers and aromatic dianhydride monomers present in the preparation of the poly(amic acid) polymer can influence the chemical structure of the polyimide aerogel. In one embodiment, varying the relative concentration or addition sequence of various diamine monomers or various aromatic dianhydride monomer during the polymerization reaction can introduce diverse chemical complexity in the poly(amic acid) and polyimides.

Particularly preferred dehydrating agents suitable for use in the formation of polyimide aerogels include mixtures of an alkanoic anhydride and an organic base. Preferred alkanoic anhydrides include acetic anhydride, propionic anhydride, n-butyric anhydride, benzoic anhydride, and trifluoroacetic anhydride. Preferred organic bases include optionally substituted mono-, di- and trialkylamines, optionally substituted pyridines, optionally substituted isoquinoline, optionally substituted morpholine, optionally substituted piperadine, and optionally substituted piperazine.

In particularly preferred embodiments, methods of making polyimide aerogels comprise a chemical imidization of the intermediate poly(amic acid) which is conducted at a temperature in the range between the freezing point and the boiling point of the reaction mixture. In one preferred embodiment, the chemical imidization step is to be carried out at ambient temperature by addition of acetic anhydride (AA)/pyridine (PY) or AA/triethylamine to the poly(amic acids) solution. The molar ratio of AA to PY is at range of 0.8 to 1.2. The molar ratio of acetic anhydride to amic acid is about 1–10, preferably about 5–10. The gelation time usually takes from about 1 minute to several days; more preferably the gelation time takes about 30 minutes to several hours, e.g., about 2, 3, 4 or 5 hours.

During chemical imidization, the newly formed rigid polyimide chain segment causes the polymer to form a gel because the rigid polyimide phase separates from the solvent. Although not wishing to be bound by theory, rigid polyimide domains formed by imidization of the intermediate poly(amic acid) appear to gel during imidization by phase separating of the polyimide from the solvent system.

Polyimide gels of the invention, which are prepared using a chemical imidization process, typically require a thermal treatment at elevated temperatures to convert the isoimide and the residual amic acid to the imide, e.g., a post-cure step. The solubility of the polyimide decreases dramatically with the degree of imidization as the chain structure stiffens. As a result, the completion of chemical imidization at ambient temperature is hindered by the increased immobility of the polyimide's rigid rod-like structure.

Post curing at elevated temperatures, either before or after solvent removal, completes the imidization process. The post-curing also rearranges the isoimide links to imide links, and is expected to induce crystallization, therefore, enhance the mechanical strength of the gel. The induced crystallization depends on the post-curing temperature, cure time, heating rate, the post-curing environment, and pressure applied during the post-curing.

In one embodiment of the invention, a post-curing step is carried out before solvent removal and the post-cure step is performed in an autoclave, preferably in a pressurized autoclave. The gels are placed in the autoclave before it is flushed with nitrogen or argon and then sealed. The application of a moderate pressure, less than 2000 psi, is preferred at temperatures above 220° C. in order to reduce the solvent evaporating from the gels. The post-curing after solvent removal is simply performed either in an inert atmosphere, such as argon, or under vacuum. The heating rate of the post-curing for dried aerogel shall be slow enough to prevent gel shrinkage resulting from the melting. The post-curing is carried out at temperatures ranging from 50° C. to 250° C. for a period of time. The linear shrinkage caused by post-curing is usually less than 15%.

Figure 1:
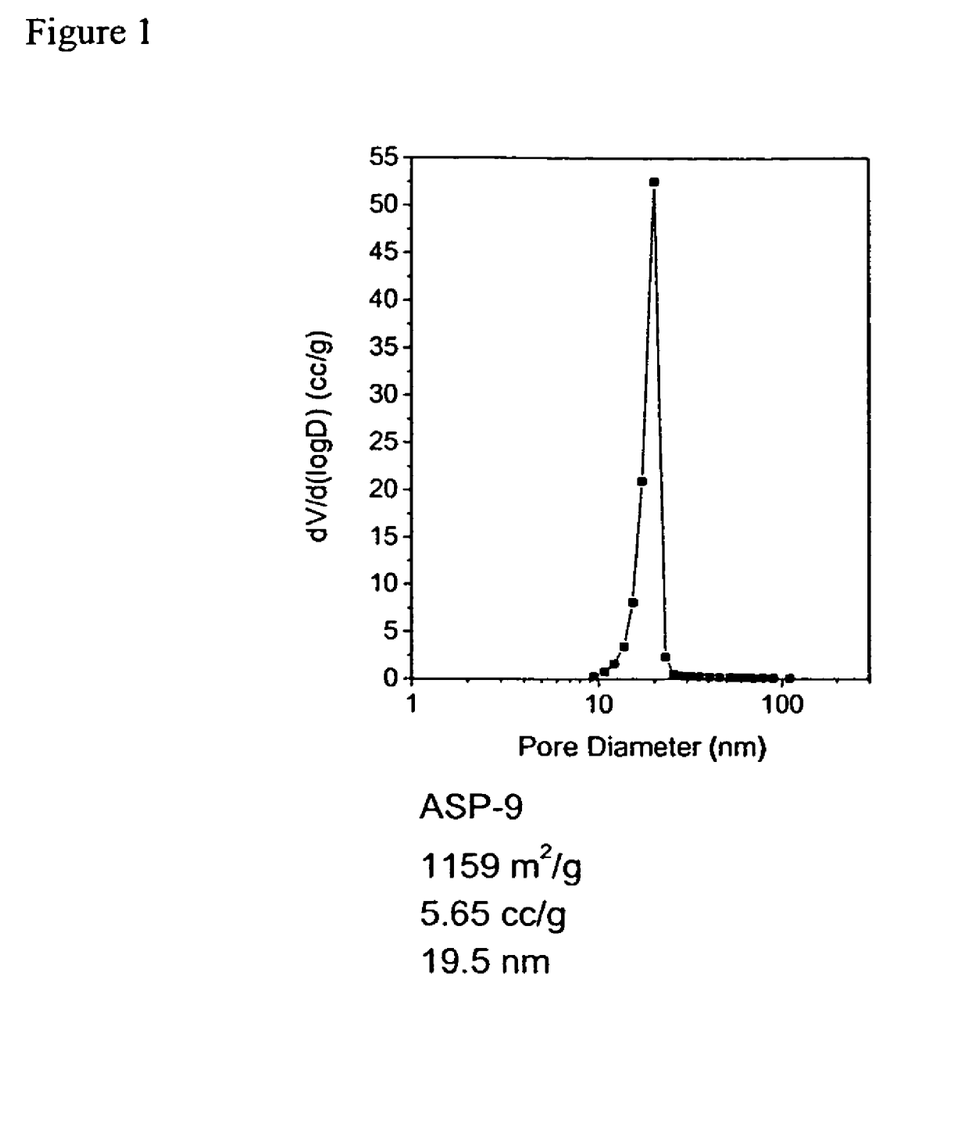
FIG. 1 is a plot of the pore size distribution of the carbon aerogel derived from polyimide aerogel.
Figure 2A:
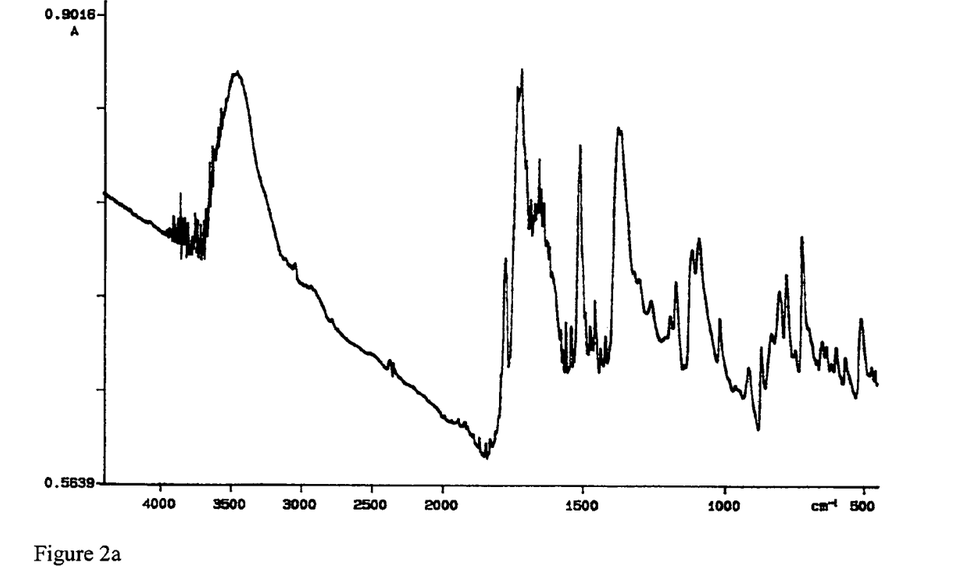
FIG. 2a is a FTIR spectra of sample 24 before thermal annealing.
Figure 2B:
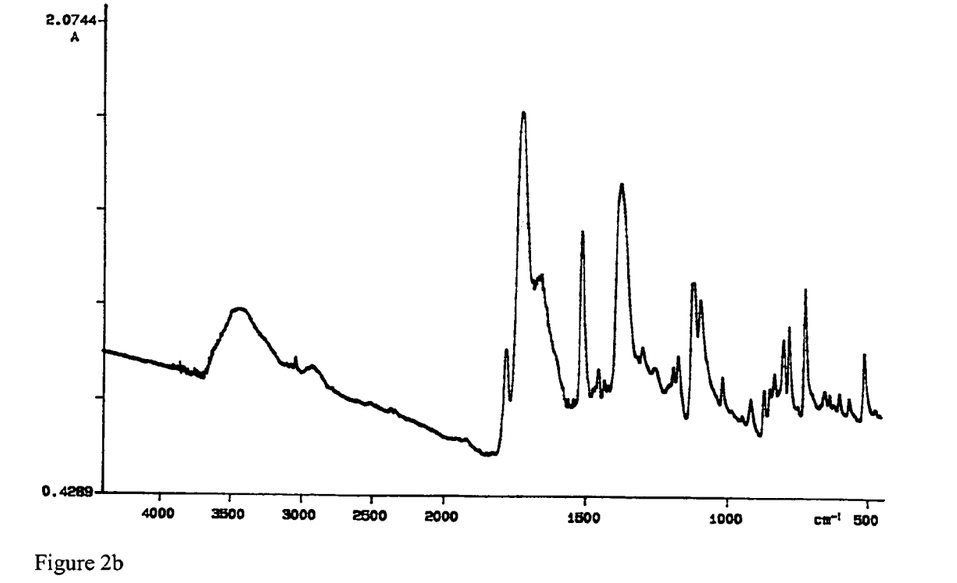
FIG. 2b is a FFTIR spectra of sample 24 after annealing at 150° C./1 h, 200° C./1 h, 250° C./1 h, and 300° C./30 min.
Figure 3:
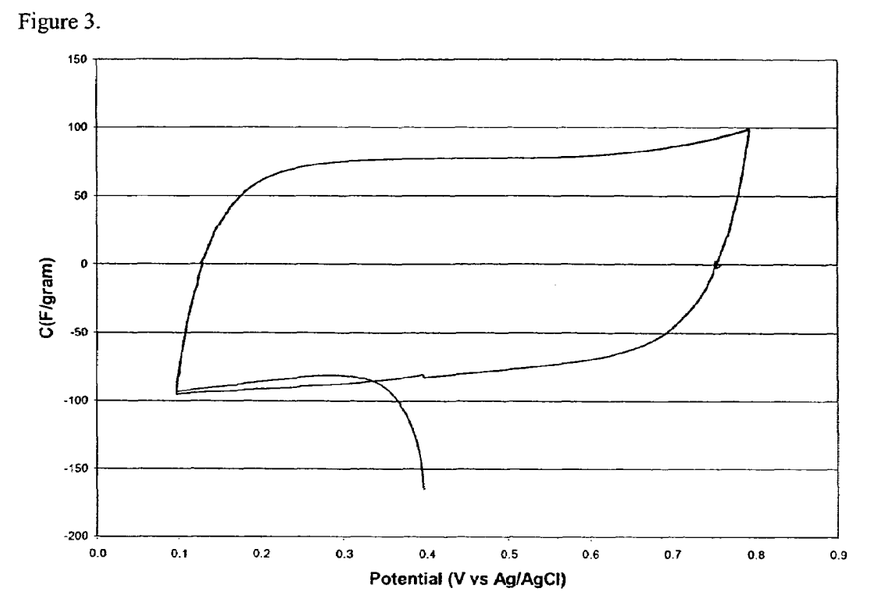
FIG. 3 is a graph of the CV curve of the carbon aerogel plotted as potential in volts versus capacitance in farads per gram in 1M $H_2SO_4$.
Figure 4:
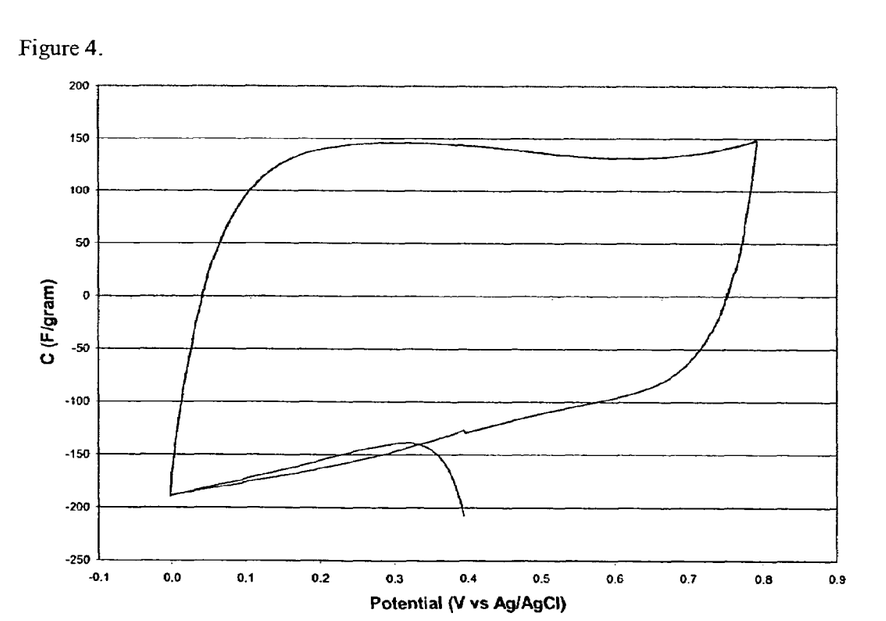
FIG. 4 is a graph of the CV curve of the Ru doped carbon aerogel plotted as potential in volts versus capacitance in farads per gram in 1M $H_2SO_4$.
Figure 5:
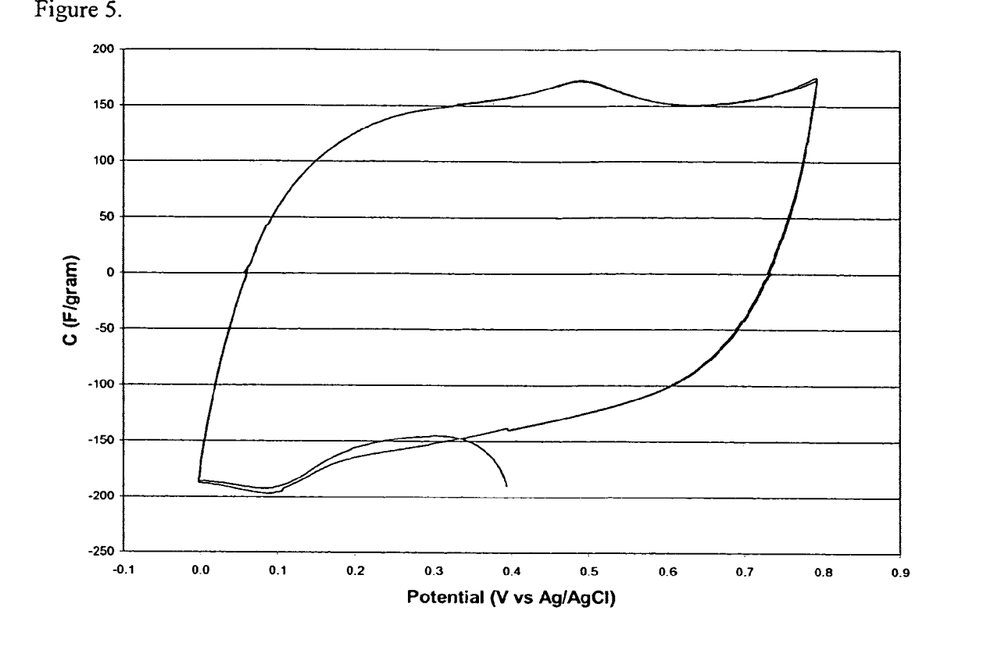
FIG. 5 is a graph of the CV curve of the Mo doped carbon aerogel plotted as potential in volts versus capacitance in farads per gram in 1M $H_2SO_4$.
Figure 6:
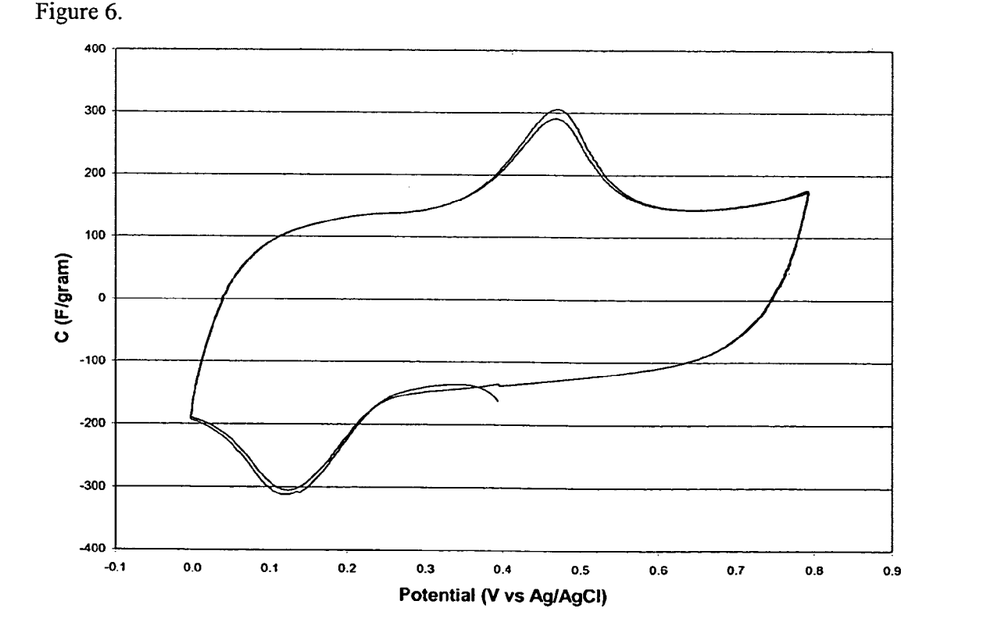
FIG. 6 is a graph of the CV curve of the W doped carbon aerogel plotted as potential in volts versus capacitance in farads per gram in 1M $H_2SO_4$.

The effectiveness of various post-cure procedures has been investigated by monitoring the effect of thermal annealing of a polyimide gel using FT-IR spectroscopy. FT-IR spectra for one polyimide arogel are illustrated in FIG. 2. The IR spectra of the polyimide is characterized by the absorption bands at 1790 $cm^{-1}$, 1739 $cm^{-1}$ (C=O), and 1550 $cm^{-1}$. The IR spectra of polyisoimide is characterized by absorption bands at 1807 $cm^{-1}$ (C=O) and 980 $cm^{-1}$ (C—O). The IR spectra of poly(amic acids) have absorption bands at 1723 $cm^{-1}$ and 1656 $cm^{-1}$ and a broader band at 1540 $cm^{-1}$. The infrared spectra indicate that the concentration of polyisoimide and poly(amic acid) species decrease after thermal annealing.

In preferred embodiments, the process of producing polyimide aerogels comprises the use of NMP, which is not miscible with $CO_2$, as the first solvent and a solvent exchange step in which the first solvent is exchanged for a second solvent that is miscible with $CO_2$ and the second solvent is selected from ethanol, acetone, toluene, THF or a mixture of cyclohexane and one of ethanol, acetone, toluene, or THF.

In other preferred embodiments, the process of producing polyimide aerogels comprises the use of either DMAc (dimethylacetamide) or DMF (dimethylformamide) as the first solvent such that no solvent exchange steps are necessary because supercritical $CO_2$ is miscible with DMAc or DMF and solutions thereof.

Drying at supercritical conditions of $CO_2$ consists of first exchanging the solvent present in the porosity of the gels by $CO_2$ and in the second step heating the autoclave beyond the critical temperature of $CO_2$ which is 31.06° C. and a pressure greater than about 1070 psig. In an alternative way, the drying of aerogels is carried out directly by heating the autoclave beyond the critical temperature of $CO_2$. The system is kept at these conditions for half an hour to be sure that all $CO_2$ is at its hypercritical conditions. After that, the autoclave is depressurized slowly to atmospheric pressure.

Heating the polyimide aerogel at elevated temperatures sufficient to pyrolyze the polyimide aerorgel in an inert atmosphere leads to formation of a carbon aerogel, metal carbide aerogel, metal carbon-carbon hybrid aerogel or a metal oxide-metal carbide aerogel depending on the pyrolysis temperature and composition of the aerogel. The carbonized aerogels retain the interconnecting mesoporous morphology of the polyimide aerogel The present invention further provides methods of forming carbon aerogels from polyimide aerogels of the invention. Preferred methods of the invention for making carbon aerogels comprise the steps of:

providing a polyimine aerogel of the invention prepared by one of the methods of polyimide aerogel preparation disclosed herein; and pyrolyzing the polyimide aerogel under in an inert atmosphere to form a carbon aerogel.

More particularly, preferred processes of producing a carbon aerogel of the invention comprise the steps of:

contacting a diamine monomer and an aromatic dianhydride monomer in a solvent under conditions conducive to formation of a poly(amic acid);

contacting the poly(amic acid) in a solvent with a dehydrating agent to form a polyimide by imidization;

drying the polyimide gel in the presence of supercritical $CO_2$ to afford an polyimide aerogel; and pyrolyzing the polyimide aerogel under in an inert atmosphere to form a carbon aerogel.

Preferably, processes of producing polyimide aerogels in which the first solvent is not miscible with supercritical $CO_2$, the method further comprises the step of exchanging the first solvent with a second solvent which is miscible with supercritical $CO_2$ prior to drying the polyimide gel.

Preferred methods of carbon aerogel formation provided by the present invention are suitable for formation of carbon aerogels which have a surface area in excess of about 500 m2/g, more preferably a surface area in excess of about 600 $m^2/g$, about 650 $m^2/g$, about 700 $m^2/g$, about 750 $m^2/g$, about 800 $m^2/g$, about 850 $m^2/g$, about 900 $m^2/g$, about 950 $m^2/g$, or about 1000 $m^2/g$, or even more preferably a surface area in excess of about 1000 $m^2/g$, 1050, 1100, 1150, 1200, or 1250 $m^2/g$. Other preferred carbon aerogels of the present invention have a surface area of between about 500 $m^2/g$ and about 1200 $m^2/g$ or between about 600 and about 1000 $m^2/g$.

Preferred methods of carbon aerogel formation provided by the present invention are also suitable for formation of carbon aerogels which have a mesoporous pore size of between about 1 nm and about 200 nm, more preferably between about 2 and about 150 nm, or between about 5 nm and about 100 nm. Particularly preferred methods of the invention are suitable for the formation of carbon aerogels having a mesoporous pore size of between about 10 nm and about 70 nm or between about 20 nm and about 50 run, or between about 20 nm and 40 nm, or preferably between about 20 nm and about 30 nm.

The methods of carbon aerogel production provided by the present invention comprise a step of pyrolyzing a polyimide aerogel prepared by the methods disclosed herein. Although suitable pyrolysis temperatures are not particularly limited, preferred pyrolysis temperatures are selected to insure complete pyrolysis of the polyimide precursor. Typically preferred pyrolysis steps are carried out at a temperature of between about 500° C. and about 2000° C., more preferably between about 550° C. and about 1600° C. Particularly preferred pyrolysis temperatures suitable for carbon aerogel formation include pyrolysis temperatures of about 600° C., about 650° C., about 700° C., about 750° C., about 800° C., about 850° C., about 900° C., about 950° C., about 1000° C., about 1050° C., about 1100° C., about 1150° C., about 1200° C., or about 1250° C. Further, preferred pyrolysis steps for formation of carbon aerogels are conducted in an inert atmosphere which typically include reduced pressure atmospheres or an inert gas atmosphere such as nitrogen, helium, neon, argon, combinations thereof and other gases which are non-reactive with the polyimide during the pyrolysis process.

The methods of the present invention for the formation of carbon aerogels typically result in the formation of carbon aerogels which further comprise nitrogen, e.g., carbon-nitrogen aerogels or nitrogen doped carbon aerogels. While not wishing to be bound by theory, the inclusion of nitrogen into the carbon aerogel is believed to be incorporated during pyrolysis of the precursor polyimide. Preferred carbon aerogels of the invention typically comprise between about 0% and about 15% nitrogen by weight of the carbon aerogel, more preferred carbon aerogels of the invention typically have a nitrogen content of between about 1% and about 10% nitrogen by weight. Typically preferred nitrogen containing aerogels include those wherein the nitrogen content is about 2%, 3%, 4%, 5%, 6%, 7%, 8% or about 9% by weight of the aerogel.

The present invention further provides aerogels comprising one or more transition metals dispersed or impregnated therein. Typically the transition metals are present in the aerogel at an amount of from about 0.01% to about 50% by weight. The invention further features various methods for producing transition metal impregnated aerogels.

In a first approach, a polyimide gels with metal ion salts remaining in the solution. The metal ion salts are precipitated onto the gel by partially evaporating the residue solvent under vacuum. The subsequent supercritical $CO_2$ drying removes rest of the solvent yielding a xerogel-aerogel hybrid. The method comprising the steps of:

contacting a diamine monomer and an aromatic dianhydride monomer in a solvent under conditions conducive to formation of a poly(amic acid);

dissolving a soluble metal ion salt and the poly(amic acid) in a solvent;

contacting the solution of poly(amic acid) and soluble metal ion salt with a dehydrating agent to form a polyimide gel by imidization of the poly(amic acid);

drying the polyimide gel in the presence of supercritical $CO_2$ to afford an polyimide aerogel; and pyrolyzing the derived aerogel under protection of an inert atmosphere to form the carbon aerogel having highly dispersed transition metal particles.

In preferred embodiments, the invention provides processes for producing carbon aerogels in which the first solvent is not miscible with supercritical $CO_2$. The method further comprises the step of exchanging the first solvent with a second solvent which is miscible with supercritical $CO_2$ prior to drying the polyimide gel.

In another approach, metal salts that remain in the solution during the gelation of the polyimide are precipitated onto the polyimide gel by conversion of the metal salt into an insoluble compound induced by a chemical reagent or precipitated by partial evaporation of the solvent system. The process comprising the steps of:

contacting a diamine monomer and an aromatic dianhydride monomer in a solvent under conditions conducive to formation of a poly(amic acid);

dissolving a soluble metal ion salt and the poly(amic acid) in a solvent;

contacting the solution of poly(amic acid) and soluble metal ion salt with a dehydrating agent to form a polyimide gel by imidization of the poly(amic acid);

precipitating at least a portion of the soluble metal salt onto the gelatinized polyimide;

drying the polyimide gel in the presence of supercritical $CO_2$ to afford an polyimide aerogel; and pyrolyzing the derived aerogel under protection of an inert atmosphere to form the carbon xerogel-aerogel having highly dispersed transition metal particles.

In preferred embodiments, the invention provides processes of producing carbon xerogel-aerogel hybrid impregnated with highly dispersed metal particles in which the first solvent is not miscible with supercritical $CO_2$; the method further comprises the step of exchanging the first solvent with a second solvent which is miscible with supercritical $CO_2$ prior to drying the polyimide gel.

In other preferred embodiments, the invention provides processes of producing carbon xerogel-aerogel hybrid impregnated with highly dispersed metal particles in which precipitation of the soluble metal salt is induced by solvent evaporation, preferably under reduced pressure to accelerate metal deposition. Alternatively, precipitation of the soluble metal salt may be induced by contacting the soluble metal salt with one or more chemical reagents capable of transforming the soluble metal salt to another metal complex with has reduced solubility in the solvent system.

In yet another approach, polyimide and metal oxide are co-gelled simultaneously into an interpenetrating network by chemical imidization of polyimide and addition of an epoxide to convert the metal salt into a metal oxide gel. The interpenetrating network of polyimide and metal oxide are suitable for use in producing metal carbide aerogels, metal carbide-carbon aerogels or carbon aerogels impregnated with highly dispersed metal particles. The process comprising the steps of:

contacting a diamine monomer and an aromatic dianhydride monomer in a solvent under conditions conducive to formation of a poly(amic acid);

preparing a solution of a soluble metal ion salt, an epoxide compound and the poly(amic acid) in a solvent such that a molar ratio of epoxide compound to the metal ion is between about 1 to about 8;

contacting the solution of poly(amic acid), an epoxide compound and soluble metal ion salt with a dehydrating agent to form a polyimide gel by imidization of the poly(amic acid);

drying the polyimide gel in the presence of supercritical $CO_2$ to afford an polyimide aerogel; and pyrolyzing the derived aerogel under protection of an inert atmosphere to form the aerogel having highly dispersed transition metal particles.

In preferred embodiments, the invention provides processes of producing metal carbide aerogel, a metal carbide-carbon aerogel or carbon aerogel impregnated with highly dispersed metal particles in which the first solvent is not miscible with supercritical $CO_2$, the method further comprises the step of exchanging the first solvent with a second solvent which is miscible with supercritical $CO_2$ prior to drying the polyimide gel.

Metals suitable for use in any one of the preceding methods for producing carbon aerogel or carbon xerogel-aerogel hybrid impregnated with highly dispersed metal particles are not particularly limited and may include elemental metals, organometallic compounds, coordination inorganic compounds, metal salts or any combination thereof. Typically preferred metals, which are suitable for use in the methods of the invention, include those metals selected from the group consisting of Ti, Zr, V, Nb, Cr, Mo, Mn, Fe, Ru, Co, Rh, Ni, Pd, Pt, Cu, Ag, Zn, Si, Sn, Pb, Sb, Nb, Bi, Hf, Ba, Al, B, P, As and combinations thereof. Particularly preferred metal salts include soluble metal salts of cobalt, zirconium, hafnium, iron, chromium, palladium, platinum and the like. Exemplary salts include cobalt chloride, zirconium chloride, hafnium chloride, iron chloride, chromium nitrate nonahydrate, and hydrogen hexachloroplatinate(IV) hydrate, are simply dissolved in poly(amic acids) solution or dissolved in a different solvent, which is compatible with poly(amic acids) solution, before blending with poly(amic acids).

Preferred epoxides for use in the methods for producing metal carbide aerogel, a metal carbide-carbon aerogel or carbon aerogel impregnated with highly dispersed metal particles are not particularly limited and include any epoxide having 1 to 3 epoxy groups and between 2 and about 20 carbon atoms. Typically preferred epoxide compounds include 1,2-epoxyalkanes having from 2 to about 12 carbon atoms, or more preferably 1,2-epoxy-$C_{3-6}$epoxyalkanes such as 1,2-epoxybutane and 1,2-epoxypropane. Preferably, the ratio of epoxide to metal ion in the methods methods for producing metal carbide aerogel, a metal carbide-carbon aerogel or carbon aerogel impregnated with highly dispersed metal particles is between about 1:1 and about 1:20, more preferably between about 1:8 or about 1:7, about 1:6, about 1:5 or about 1:4.

Additionally preferred epoxide compounds include those which are added to a poly(amic acids) solution or to a pre-gelatinized polyimide composition as an admixture with water, preferably deionized water.

Preferred methods for producing metal carbide aerogel, a metal carbide-carbon aerogel or carbon aerogel impregnated with highly dispersed metal particles may optionally further comprise addition of one or more gelation controlling agents to the poly(amic acid) solution prior to dehydrative polyimide formation such that a molar ratio of gelation controlling agent to metal ion is between 1:1 and about 1:20, more preferably between about 1:8 or about 1:7, about 1:6, about 1:5 or about 1:4. Typically preferred gellation controlling agents include optionally substituted acetoacetonate such as 2,4-pentanedione or an optionally substituted alkyl acetoacetate such as ethyl acetoacetate.

The present invention also provides polyimide aerogels, carbon aerogels and derivatives thereof which may optionally further comprise one or more reinforcement agents to increase the mechanical strength of the base aerogel composition. Typically preferred reinforcement agents are not particularly limited but include, for example, glass fibers, graphite fibers, carbon fiber precursors, metallic or inorganic fillers and particles. Preferred reinforcing agents suitable for use in the aerogels of the invention may be incorporated into the polyimide gel without adversely affecting the gelation ability of the polyimide. Typically reinforcing agents are present in aerogel compositions of the invention at 0.01% to about 20% by weight, more preferably reinforcing agents are present at 0.1% to about 10% by weight.

In another embodiment of the invention, methods for production of reinforced aerogels, including reinforced polyimide aerogels, carbon aerogels, metal carbide aerogels, a metal carbide-carbon aerogels, or carbon aerogels impregnated with highly dispersed metal particles, are provided in which one or more reinforcing agents are added to a poly(amic acid) solution prior to imidization or to a polyimide wet gel prior to drying with supercritical $CO_2$. Typically preferred reinforcing agents include reinforcement fibers, carbon nanotubes, metallic fillers or particles, inorganic fillers or particles or combinations thereof. Other preferred reinforcing agents include unwoven fiber reinforcements composed of a polymeric material, a fiber glass, a ceramic fiber, a carbon precursor fiber, or a biopolymer fiber.

Preferred processes for producing polyimide aerogels, carbon aerogels, metal carbide aerogels, a metal carbide-carbon aerogels, or carbon aerogels impregnated with highly dispersed metal particles provided by the present invention include those processes in which the diamine monomer is represented by the formula $H_2N$—X—$NH_2$, wherein X represents a difunctional aliphatic hydrocarbon group, an amino-terminated polysiloxane, a difunctional aromatic hydrocarbon group, or difunctional heteroaromatic group which may be optionally substituted.

Particularly preferred processes include the use of an aromatic diamine monomer represented by either formula (I) and (II)

(I)

(II)

wherein X and Y are monofunctional substituents selected from hydrogen, halogen, carboxyl, lower alkyl and lower alkoxyl groups, X and Y may be the same or different substituents and A is a bivalent connecting group selected from —O—, —S—, -Co—, —S—, —SO$_2$—, and —CH$_2$—, or A is a single bond; wherein alkyl or alkoxy contains 1 to 4 carbon atoms.

Preferred aromatic diamine monomers of Formula I or Fromula II include those aromatic diamine monomers in which each occurrence of X and optionally Y is hydrogen, methyl, or chloro. More preferred monomers of Formula I or Formula II include those monomers in which each occurrence of X and Y is hydrogen.

Other preferred processes of the present invention include those where the diamine monomer represented by the formula H$_2$N—X—NH$_2$ is an aliphatic diamine containing a linear alkyl chain unit of formula.

wherein n is a integer number from 1 to 12; or an amino terminated polysiloxane of the formula wherein R$_1$ and R$_2$ are each independently selected from the group consisting of hydrogen, optionally substituted alkyl, optionally substituted alkenyl, optionally substituted alkynyl, optionally substituted cycloalkyl, optionally substituted cycloalkyl-alkyl, optionally substituted aryl, optionally substituted aralkyl, and optionally substituted alkoxy.

Particularly preferred amino terminated polysiloxane monomers include those polysiloxanes of the formula which are thermally stable wherein R$_1$ and R$_2$ are independently selected from optionally substituted alkyl having from 1 to about 12 carbon atoms and optionally substituted phenyl.

Preferred processes for producing polyimide aerogels, carbon aerogels, metal carbide aerogels, a metal carbide-carbon aerogels, or carbon aerogels impregnated with highly dispersed metal particles provided by the present invention include those processes in which the dianhydride is represented by the formula C$_2$O$_3$—X—C$_2$O$_3$, wherein the X represents a difunctional alicyclic hydrocarbon group, a difunctional aromatic hydrocarbon group, or a difunctional heteroaromatic group which may be optionally substituted.

Particularly preferred processes include the use of an aromatic dianhydride monomer represented by either formula III or IV

III

IV wherein X and Y are monofunctional substituents selected from hydrogen, halogen, carboxyl, alkyl, and alkoxy groups, X and Y may be the same or different substituents and A is a bivalent connecting group selected from —O—, —S—, —CO—, —S—, —SO$_2$—, —CH$_2$—, or A is a single bond.

The present invention also provides aerogels prepared by the methods of the present invention. More particularly, the present invention provides polyimide aerogels, carbon aerogels, metal carbide aerogels, carbon-metal carbide composite aerogels and aerogels impregnated with highly dispersed metal particles. Preferred aerogels provided by the present invention include those aerogels prepared by any one of the methods or processes provided herein.

Preferred polyimide aerogels of the present invention include those aerogels which comprise a polyimide polymer of the formula:

wherein represents an optionally substituted aryl group, an optionally substituted alicyclic group, an optionally substituted heteroaryl group, or an optionally substituted heteroalicyclic group;

R is an optionally substituted difunctional aryl, difunctional optionally substituted alkylene, optionally substituted difunctional alicyclic hydrocarbon group, an optionally substituted difunctional heteroaryl, bis(3-aminopropy) terminated polysiloxane or a combination thereof; and x is a number greater than about 2.

More preferred polyimide aerogels of the invention include those aerogels comprising an polyimide according to the formula wherein represents an optionally substituted aryl group;

R is an optionally substituted difunctional aryl, difunctional optionally substituted alkylene, or a combination thereof; and x is a number greater than about 2.

More preferred polyimide aerogels of the invention include those aerogels comprising an polyimide according to the formula in which the group represents phenyl or biphenyl;

R represents phenyl, biphenyl, $C_{1-12}$alkylene; and x is a number greater than about 5.

Preferred polyimide aerogels of the present invention have a density of less than about 0.8 g/cc or less, or 0.5 g/cc or less, more preferably a density of about 0.4 g/cc, about 0.3 g/cc, about 0.2 g/cc, or less. Particularly preferred polyimide aerogels of the present invention have a density of between about 0.01 g/cc to about 0.4 g/cc.

Preferred polyimide aerogels of the present invention have a yield strength of about 1 MPa or more, more preferably a yield strength of about 2, 3, 4 or 5 MPa or more, or between about 1 MPa and about 10 MPa.

Preferred polyimide aerogels provided by the present invention have a surface area in excess of about 400 m$^2$/g, more preferably a surface area in excess of about 500 m$^2$/g, about 600 m$^2$/g, about 700 m$^2$/g, about 750 m$^2$/g, about 800 m$^2$/g, about 850 m$^2$/g about 900 m$^2$/g, about 950 m$^2$/g, or about 1000 m$^2$/g, or even more preferably a surface area in excess of about 1000 m$^2$/g, 1050, 1100, 1150, 1200, or 1250 m$^2$/g. Other preferred polyimide aerogels of the invention have a surface area of between about 500 m$^2$/g and about 1000 m$^2$/g or between about 500 m$^2$/g and about 1200 m$^2$/g.

Preferred polyimide aerogels of the present invention have a mesoporous pore size of between about 1 nm and about 200 run, more preferably between about 2 and about 150 run, or between about 5 nm and about 100 nm. polyimide aerogels of the present invention have a mesoporous pore size of between about 10 nm and about 70 nm or between about 20 nm and about 30 nm, about 40 nm or about 50 nm.

The present invention further provides carbon aerogels prepared by any one of the processes for making a carbon aerogel disclosed herein.

Preferred carbon aerogels of the present invention have a density of less than about 0.5 g/cc or less, more preferably a density of about 0.4 g/cc, about 0.3 g/cc, about 0.2 g/cc, or less. Particularly preferred carbon aerogels of the present invention have a density of between about 0.01 g/cc to about 0.4 g/cc.

Preferred carbon aerogels of the present invention have a yield strength of about 1 MPa or more, more preferably a yield strength of about 2, 3, 4 or 5 MPa or more, or between about 1 MPa and about 10 MPa.

Preferred carbon aerogels provided by the present invention have a surface area in excess of about 400 m$^2$/g, more preferably a surface area in excess of about 500 $m^2/g$, about 600 $m^2/g$, about 700 $m^2/g$, about 750 $m^2/g$, about 800 $m^2/g$, about 850 $m^2/g$, about 900 $m^2/g$, about 950 $m^2/g$, or about 1000 $m^2/g$, or even more preferably a surface area in excess of about 1000 $m^2/g$, 1050, 1100, 1150, 1200, or 1250 $m^2/g$. Other preferred polyimide aerogels of the invention have a surface area of between about 500 $m^2/g$ and about 1000 $m^2/g$ or between about 500 $m^2/g$ and about 1200 $m^2/g$.

Preferred carbon aerogels of the present invention have a mesoporous pore size of between about 1 nm and about 200 nm, more preferably between about 2 and about 150 nm, or between about 5 nm and about 100 nm. Carbon aerogels of the present invention have a mesoporous pore size of between about 10 nm and about 70 nm or between about 20 nm and about 30 nm, about 40 nm or about 50 nm.

The present invention further provides carbon aerogels which comprise carbon and nitrogen. Preferred carbon aerogels of the invention typically comprise between about 0% and about 15% nitrogen by weight of the carbon aerogel, more preferred carbon aerogels of the invention typically have a nitrogen content of between about 1% and about 10% nitrogen by weight or between about 2% and about 8% nitrogen by weight. Typically preferred nitrogen containing aerogels include those wherein the nitrogen content is about 2%, 3%, 4%, 5%, 6%, 7%, 8% or about 9% by weight of the aerogel.

In certain embodiments, the present invention also provides carbon aerogels having metal nanoparticles dispersed or impregnated throughout the pores of the aerogel. Preferred metal impregnated carbon aerogels of the invention include those prepared by any one of the methods of producing carbon aerogels impregnated with highly dispersed metal particles. Preferred metal impregnated carbon aerogels typically have a ratio of carbon to metal in the range of about 1:1 to about 1000:1.

Preferred metal impregnated carbon aerogels of the present invention may comprise any metal which may be deposited or impregnated into the carbon aerogel. Suitable metals include those selected from the group consisting of Ti, Zr, V, Nb, Cr, Mo, Mn, Fe, Ru, Co, Rh, Ni, Pd, Pt, Cu, Ag, Zn, Si, Sn, Pb, Sb, Nb, Bi, Hf, Ba, Al, B, P, As and combinations thereof.

The present invention further provides hybrid aerogels comprising carbon aerogel domains and metal carbide aerogel domains prepared by any one of the processes for making a hybrid carbon-metal carbide aerogel disclosed herein. Preferred hybrid carbon-metal carbide aerogels comprise interpenetrating domains of carbon aerogel and metal carbide aerogel.

In certain preferred embodiments of the invention, hybrid carbon-metal carbide aerogels may be electrical conductors or semiconductors.

The present invention also features hybrid carbon-metal carbide aerogels prepared by any one of the processes for making metal carbide aerogels disclosed herein. Preferred metal carbide aerogels are typically prepared by pyrolysis a metal impregnated polyimide aerogel of the invention. In certain instances, hybrid carbon-metal carbide aerogels are also referred to herein as composite aerogels or composite carbon-metal carbide aerogels.

Preferred hybrid carbon-metal carbide aerogels and metal carbide aerogels of the present invention have a density of less than about 1.0 g/cc or less, or about 0.8 g/cc or less, more preferably a density of between about 1.0 g/cc and about 0.1 g/cc, or between about 0.8 and about 0.2 g/cc.

Preferred hybrid carbon-metal carbide aerogels and metal carbide aerogels of the present invention have a yield strength of about 1 MPa or more, more preferably a yield strength of about 2, 3, 4 or 5 MPa or more, or between about 1 MPa and about 10 MPa.

Preferred hybrid carbon-metal carbide aerogels and metal carbide aerogels provided by the present invention have a surface area in excess of about 100 $m^2/g$, more preferably a surface area in excess of about 200 $m^2/g$, about 300 $m^2/g$, about 400 $m^2/g$, about 500 $m^2/g$, about 600 $m^2/g$, about 700 $m^2/g$, about 800 $m^2/g$, about 950 $m^2/g$, or about 1000 $m^2/g$, or more. Even more preferably, hybrid carbon-metal carbide aerogels have a surface area of between about 100 and about 1000 $m^2/g$, or between about 200 m $2/g$ and about 800 $m^2/g$.

Preferred hybrid carbon-metal carbide aerogels and metal carbide aerogels of the present invention have a mesoporous pore size of between about 1 nm and about 200 nm, more preferably between about 2 and about 150 nm, or between about 5 nm and about 100 nm. Hybrid carbon-metal carbide aerogels and metal carbide aerogels of the present invention have a mesoporous pore size of between about 10 nm and about 70 nm or between about 20 nm and about 30 nm, about 40 nm or about 50 nm.

Certain preferred carbon aerogels, metal carbide aerogels, and hybrid carbon-metal carbide aerogels are suitable for use as an electrode material in electrochemical double-layer capacitors and related electrochemical storage devices, which store energy at the interface between the electrode and the liquid electrolyte. The carbon aerogel and metal-carbon aerogel materials of the invention offer the advantage of a monolithic structure, which eliminates the particle-particle contact resistance of carbon black powders and other particulate electrochemical electrolytes.

Applicants have surprisingly discovered that carbon aerogels of the invention which have been doped with one or more transition metals, e.g., carbon-metal aerogels, offer significantly higher energy densities and power densities as compared to carbon aerogels which have not been doped with a metal including those carbon aerogels of the invention which are prepared from polyimide aerogel precursors or carbon aerogels prepared from resorcinol-formaldehyde (RF) aerogel precursors.

Although not wishing to be bound by theory, it appears that the improved performance, e.g., increased capacitance, observed for electrochemical capacitors comprising an electrode composed of a metal-carbon aerogel is, in part, due to combining the double layer capacitance exhibited by the carbon aerogel with a pseudocapacitance exhibited by the transition metal. In another possible theory, the alteration of the carbon aerogel structure caused by the incorporation of one or more metals may have induced the increased performance of electrochemical double-layer capacitors comprising a metal-carbon aerogel of the invention as the electrode. Applicants have noted that incorporation of a metal into the carbon aerogel, e.g., use of a metal-carbon aerogel, can result in a doubling of capacitor performance. For example, metal carbon aerogels comprising one of W, Mo, or Ru result in capacitors with approximately doubled capacity compared to carbon aerogel based capacitors.

The present invention further provides hybrid carbon-metal carbide aerogels which additionally comprise nitrogen, which may be present in the carbon aerogel domain the metal carbide aerogel domain or distributed throughout the hybrid carbon-metal carbide aerogel. Typically, hybrid carbon-metal carbide aerogels of the invention comprise between about 0.01% and about 15% nitrogen by weight of the hybrid carbon-metal carbide aerogel, more preferred hybrid carbon-metal carbide aerogels of the invention typically have a nitrogen content of between about 1% and about 10% nitrogen by weight or between about 2% and about 8% nitrogen by weight. Typically preferred nitrogen containing aerogels include those wherein the nitrogen content is about 2%, 3%, 4%, 5%, 6%, 7%, 8% or about 9% by weight of the aerogel.

In certain embodiments, the present invention also provides hybrid carbon-metal carbide aerogels and metal carbide aerogels having metal nanoparticles dispersed or impregnated throughout the pores of the aerogel. Preferred metal impregnated hybrid carbon-metal carbide aerogels and metal carbide aerogels of the invention include those prepared by any one of the methods of producing hybrid carbon-metal carbide aerogels and metal carbide aerogels impregnated with highly dispersed metal particles. Preferred metal impregnated carbon aerogels typically have a ratio of carbon to metal in the range of about 1:1 to about 1000:1.

Preferred metal impregnated hybrid carbon-metal carbide aerogels and metal carbide aerogels of the present invention may comprise a second metal which may be deposited or impregnated into the hybrid carbon-metal carbide aerogel. Suitable second metals include those selected from the group consisting of Ti, Zr, V, Nb, Cr, Mo, Mn, Fe, Ru, Co, Rh, Ni, Pd, Pt, Cu, Ag, Zn, Si, Sn, Pb, Sb, Nb, Bi, Hf, Ba, Al, B, P, As and combinations thereof. Typically the second metal particles dispersed or impregnated into the hybrid carbon-metal carbide aerogel or metal carbide aerogels may be the same or different from the metal present in the metal carbide domains.

All documents mentioned herein are incorporated herein by reference.

EXAMPLES

Example 1

Preparation of Poly(Amic Acids)

1,2,4,5-benzenecarboxylic dianhydride (0.018 mole, 3.928 grams) and 4,4'-oxydianiline (0.018 mole, 3.604 grams) were dissolved in 68 grams of NMP solution at about 10% solid concentration. The reaction of poly(amic acids) was carried out at ambient temperature with constant stirring under protection of argon for overnight.

Example 2

Preparation of Polyimide Aerogel 5.0 grams of poly(amic acids) solution from Example 1 was diluted with 20 grams of NMP to prepare a wet gel at concentration of 0.02 grams/cc. 0.78 grams of acetic anhydride (AA) (molar ratio to dianhydride: 5:1) and 0.60 grams of pyridine (PY) (molar ratio to acetic anhydride: 1:1) were added to the reaction system. A polyester fiber blanket was placed in the gel for reinforcement. It took less than 3 to 4 hours to gel. The gel was post cured initially at 90° C. for 2 hours and then at 190° C. under pressure of 800 psi for ½ hours. The original solvent in the gel was exchanged with ethanol 2 to 3 times followed by supercritical $CO_2$ drying. The thermal conductivity of the sample was 15.3 mW/m*K.

Example 3

Preparation of Polyimide Aerogel 12.5 grams of poly(amic acids) solution from Example 1 was diluted with 12.5 grams of NMP to prepare a wet gel at concentration of 0.05 grams/cc. 1.96 grams of acetic anhydride (AA) (molar ratio to dianhydride: 5:1) and 1.52 grams of pyridine (PY) (molar ratio to acetic anhydride: 1:1) were added to the reaction system. It took less than 1 hour for the sample to gel. The gel was post cured in a pressurized autoclave at 210° C. and 800 psi for 2 to 3 hours. The original solvent in the gel was exchanged with ethanol 2 to 3 times followed by supercritical $CO_2$ drying.

Examples 4–6

Preparation of Carbon Aerogels

Polyimide aerogels with various densities were prepared. The poly(amic acids) from Example 1 was diluted with different amount of NMP solvent to the desired solute concentrations listed in Table I. Acetic anhydride (AA) (molar ratio to dianhydride: δ: 1) and pyridine (PY) (molar ratio to acetic anhydride: 1:1) were added to the reaction system. The original solvent in the gel was exchanged with ethanol 2 to 4 times followed by supercritical $CO_2$ drying. Finally, the polyimide aerogel was pyrolyzed at elevated temperatures under argon flow for 2 to 3 hours. The surface area, pore size, and pore size distribution of the carbon aerogels were analyzed by Brunauer-Emmett-Teller (BET) method. The results are summarized in Table I.

TABLE I

| Sample No. | 1 | 2 | 3 |
|---|---|---|---|
| Gel density (gram/cc) | 0.10 | 0.02 | 0.03 |
| Pyrolysis temperature | 600° C. | 1050° C. | 600° C. |
| Average pore size (nm) | 19.5 | 28.2 | 40 |
| Specific surface area ($m^2$/gram) | 1159 | 1063 | 1328 |

Example 7

Preparation of Copoly(Amic Acids)-Polydimethylsiloxane Solution 4.00 grams of 1,2,4,5-benzenecarboxylic dianhydride (0.01833 mole), 3.615 grams of 4, 4'-oxydianiline (0.01805 mole), and 0.850 grams of poly(dimethylsiloxane), bis(3-aminopropyl) terminated (amine number 0.6–0.8 meq/g, about $3*10^{-4}$ mole and 10% in the solid content), were dissolved in a co-solvent of 2.54 grams of THF and 71.34 grams of NMP solution at about 10.3% solid concentration. The reaction was carried out at ambient temperature with constant stirring under protection of argon for overnight.

Example 8

Preparation of Poly(Imidesiloxane) Aerogel 12.14 grams of copoly(amic acids)-polydimethylsiloxane solution from Example 5 was diluted with 12.86 grams of NMP to prepare a wet gel at concentration of 0.05 grams/cc. 1.96 grams of acetic anhydride (AA) (molar ratio to dianhydride: 5:1) and 1.52 grams of pyridine (PY) (molar ratio to acetic anhydride: 1:1) were added to the reaction system. It took 2 to 3 hours for the sample to gel. The gel was post cured at 190° C. and ambient pressure for 30 minutes. The original solvent in the gel was exchanged with ethanol 7 to 8 times followed by supercritical $CO_2$ drying. The dried aerogel was post-cured under protection of argon at 250° C. for 30 minutes.

Example 9

Preparation of Cobalt/Carbon Aerogel (10% cobalt by wt.)

5.0 grams of poly(amic acids) solution from Example 1 was diluted with 20 grams of NMP at a solute concentration of 0.02 grams/cc. 0.22 gram of cobalt chloride hexahydrate was added to poly(amic acids) solution. 0.78 grams of acetic anhydride (AA) (molar ratio to dianhydride: 5:1) and 0.60 grams of pyridine (PY) (molar ratio to acetic anhydride: 1:1) were added to the reaction system. It took less than 3 to 4 hours to gel. About 60% of the solvent in the gel were distilled out under vacuum at 40° C. Rest of the solvent in the gel was exchanged with ethanol 3 to 5 times followed by supercritical $CO_2$ drying. The cobalt chloride/polyimide aerogel was pyrolyzed at 900° C. under argon flow for 3 hours.

Example 10

Preparation of Cobalt Oxide/Carbon Aerogel (10% Cobalt Oxide by wt.)

5.0 grams of poly(amic acids) solution from Example 1 was diluted with 20 grams of NMP at solute concentration of 0.02 grams/cc. 0.18 gram of cobalt chloride hexahydrate and 0.44 gram of 1,2-epoxybutane (molar ratio to cobalt: 8:1) was added to poly(amic acids) solution before addition of 0.78 grams of acetic anhydride (AA) (molar ratio to dianhydride: 5:1) and 0.60 grams of pyridine (PY) (molar ratio to acetic anhydride: 1:1) to induce the gelation. It took less than 3 to 4 hours to gel. The solvent in the gel was exchanged with ethanol 3 to 5 times followed by supercritical $CO_2$ drying. The cobalt oxide/polyimide aerogel was pyrolyzed at 900° C. under argon flow for 3 hours.

Example 11

Preparation of Platinum/Carbon Aerogel (10% of platinum by wt.)

45.0 grams of poly(amic acids) solution from Example 1 was diluted with 5.0 grams of NMP to at a solute concentration of 0.09 grams/cc. 1.06 grams of hydrogen hexachloroplatinate(IV) hydrate ($H_2PtCl_6 \cdot xH_2O$) ($2.59 \times 10^{-3}$ mole, 10% of platinum in the solid content) was dissolved in 3.0 grams of tetrahydrofuran (THF) before adding to the poly (amic acids) solution. 7.0 grams of acetic anhydride (AA) (molar ratio to dianhydride: 5:1) and 5.45 grams of pyridine (PY) (molar ratio to acetic anhydride: 1:1) were added to the system. It took less than 30 minutes for the sample to gel. After gelation, 3.0 grams of triethylamine were added to the gel to increase the solution pH beyond 9 followed by addition of 0.515 grams of formaldehyde (37% aqueous solution) ($6.35 \times 10^{-3}$ mole) to reduce the platinum to the metallic state. The original solvent in the gel was exchanged with ethanol 3 to 5 times before being dried supercritical $CO_2$. Finally, the platinum/polyimide gel was pyrolyzed at 700° C. under argon flow for 3 hours.

Example 12

Preparation of Zirconium Carbide Aerogel (Zr:C=1:3)

6.25 grams of poly(amic acids) solution from Example 1 was diluted with 18.75 grams of NMP at a solute concentration of 0.025 grams/cc. 2.91 grams of 1,2-epoxybutane (molar ratio to zirconium chloride: 3.5:1) was then added to the poly(amic acids) solution. 2.68 grams of zirconium chloride was diluted by 4.60 grams of 2,4-pentanedione (molar ratio to zirconium chloride: 4:1) before adding to the poly(amic acids) solution mixture. Then, 0.98 grams of acetic anhydride (AA) (molar ratio to amic acid repeat unit: 5:1) was added to the solution to induce the gelation. It took less than 1 hour for the sample to gel. The original solvent in the gel was exchanged with ethanol 2 times followed by supercritical $CO_2$ drying. The elemental analysis of zirconium/polyimide aerogel before pyrolysis indicates that the weight ratio of zirconium to carbon is 3.53. The aerogel was pyrolyzed at 1600° C. for 3 hours under protection of argon.

Example 13

Preparation of Hafnium Carbide Aerogel (Hf:C=1:6)

6.25 grams of poly(amic acids) solution from Example 1 was diluted with 18.75 grams of NMP at a solute concentration of 0.025 grams/cc. 1.45 grams of 1,2-epoxybutane (molar ratio to hafnium chloride: 3.5:1) was then added to the poly(amic acid) solution. 1.84 grams of hafnium chloride was diluted by 2.30 grams of 2,4-pentanedione (molar ratio to hafnium chloride: 4:1) before adding to the poly(amic acid)/hafnium chloride solution. 0.98 grams of acetic anhydride (AA) (molar ratio to amic acid repeat unit: 5:1) was added to the solution to induce the gelation. It took less than 1 hour for the sample to gel. The aerogel was pyrolyzed at 1600° C. for 3 hours under protection of argon.

Example 14

Preparation of Carbon Aerogel Electrode 12.5 grams of poly(amic acids) solution from Example 1 was diluted with 12.5 grams of DMAc to prepare a wet gel at concentration of 0.05 grams/cc. 1.96 grams of AA (molar ratio to dianhydride: 5:1) and 0.60 grams of PY (molar ratio to acetic anhydride: 1:1) were added to the reaction system. It took less than 1 hour for the sample to gel. The solvent in the gel was removed by supercritical $CO_2$ drying process. The derived aerogel sample was post-cured at 450° C. for 30 minutes. The density of the polyimide aerogel was 0.16 grams/cc. The BET surface area was 831 $m^2$/gram.

Example 15

Preparation of Ru/Carbon Aerogel (Ru: 3% by wt.)

16.2 grams of poly(amic acids) solution from Example 1 was diluted with 13.8 grams of dimethylacetamide (DMAc) at a solute concentration of 0.05 grams/cc. 0.12 grams of ruthenium chloride ($RuCl_3 \cdot xH_2O$) was diluted with a small amount of DMAc before adding to the poly(amic acids) solution. 2.35 grams of acetic anhydride (AA) (molar ratio to dianhydride: 5:1), 1.36 grams of pyridine (PY) (molar ratio to acetic anhydride: 1:1), and 0.23 grams of 1,2- epoxybutance (molar ratio to ruthenium chloride: 8:1) were added to the reaction system. It took less than 1 hour to gel. The solvent in the gel was removed by supercritical $CO_2$ drying. The Ru/polyimide gel was annealed at 450° C. for 20 minutes under protection of an argon atmosphere. The Ru/polyimide aerogel was cut into 1.5 mm thick slices and the slices were pressed into 0.5 mm thick disks to increase their density. The Ru/carbon aerogel electrode was obtained by pyrolysis at 800° C. for 3 hours under protection of a flowing argon atmosphere. The density of the carbon aerogel disks was 0.5–0.55 $g/cm^3$.

Example 16

Preparation of Mo/Carbon Aerogel (Mo: 1% by wt.)

16.2 grams of poly(amic acids) solution from Example 1 was diluted with 13.8 grams of dimethylacetamide (DMAc) at a solute concentration of 0.05 grams/cc. 0.043 grams of molybdenum chloride ($MOCl_5$) was diluted with a small amount of DMAc before adding to the poly(amic acids) solution. 2.35 grams of acetic anhydride (AA) (molar ratio to dianhydride: 5:1), 1.36 grams of pyridine (PY) (molar ratio to acetic anhydride: 1:1), and 0.091 grams of 1,2-epoxybutance (molar ratio to molybdenum chloride: 8:1) were added to the reaction system. It took less than 1 hour to gel. The solvent in the gel was removed by supercritical $CO_2$ drying. The Mo/polyimide gel was annealed at 450° C. for 20 minutes under protection of argon. The Mo/polyimide aerogel was cut into 1.5 mm thick slices and the slices were pressed into 0.5 mm thick disks to increase their density. The Mo/carbon aerogel electrode was obtained by pyrolysis at 800° C. for 3 hours under protection of a flowing argon atmosphere. The density of the carbon aerogel disks was 0.5–0.55 $g/cm^3$.

Example 17

Preparation of W/Carbon Aerogel (W: 3% by wt.)

16.2 grams of poly(amic acids) solution from Example 1 was diluted with 13.8 grams of dimethylacetamide (DMAc) at a solute concentration of 0.05 grams/cc. 0.10 grams of tungsten chloride ($WCl_6$) was diluted with a small amount of DMAc before adding to the poly(amic acids) solution. 2.35 grams of acetic anhydride (AA) (molar ratio to dianhydride: 5:1), 1.36 grams of pyridine (PY) (molar ratio to acetic anhydride: 1:1), and 0.145 grams of 1,2-epoxybutance (molar ratio to tungsten chloride: 8:1) were added to the reaction system. It took less than 1 hour to gel. The solvent in the gel was removed by supercritical $CO_2$ drying. The W/polyimide gel was annealed at 450° C. for 20 minutes under protection of an argon atmosphere. The W/polyimide aerogel was cut into 1.5 mm thick slices and the slices were pressed into 0.5 mm thick disks to increase their density. The W/carbon aerogel electrode was obtained by pyrolysis at 800° C. for 3 hours under protection of a flowing argon atmosphere. The density of the carbon aerogel disks was 0.5–0.55 $g/cm^3$.

Example 18

Preparation of Co/Carbon Aerogel (Co: 1% by wt.)

16.2 grams of poly(amic acids) solution from Example 1 was diluted with 13.8 grams of dimethylacetamide (DMAc) at a solute concentration of 0.05 grams/cc. 0.0765 grams of cobalt chloride ($CoCl_2$) was diluted with a small amount of DMAc before adding to the poly(amic acids) solution. 2.35 grams of acetic anhydride (AA) (molar ratio to dianhydride: 5:1), 1.36 grams of pyridine (PY) (molar ratio to acetic anhydride: 1:1), and 0.15 grams of 1,2-epoxybutance (molar ratio to cobalt chloride: 8:1) were added to the reaction system. It took less than 1 hour to gel. The solvent in the gel was removed by supercritical $CO_2$ drying. The Co/polyimide gel was annealed at 450° C. for 20 minutes under protection of argon. The final Co/carbon aerogel products were obtained by pyrolysis at 800° C. for 3 hours under protection of flowing argon atmosphere.

Although a preferred embodiment of the invention has been described using specific terms, such description is for illustrative purposes only, and it is to be understood that changes and variations may be made without departing from the spirit or scope of the following claims.

What is claimed is:

1. A process for producing polyimide aerogels comprising:
    contacting a diamine monomer and an aromatic dianhydride monomer in a first solvent under conditions conducive to formation of a poly(amic acid), wherein the diamine monomer is an aromatic diamine, an aliphatic diamine, a bis(ω-aminoalkyl)terminated polysiloxane or a combination thereof;
    contacting the poly(amic acid) in a said first solvent with a chemical dehydrating agent to form a polyimide gel by imidization; and
    drying the polyimide gel in the presence of supercritical $CO_2$ to afford an polyimide aerogel.

2. The process of claim 1 in which the first solvent is not miscible with supercritical $CO_2$, the method further comprises the step of exchanging the first solvent with a second solvent which is miscible with supercritical $CO_2$ prior to drying the polyimide gel.

3. The process of claim 1 in which the process further comprises post-curing the polyimide aerogel at a temperature of between about 50° C. and about 450° C. before or after supercritical $CO_2$ drying.

4. The process of claim 1, wherein the chemical dehydrating agent is a mixture of an alkanoic anhydride and an organic base selected from optionally substituted pyridines and optionally substituted trialkyl amines.

5. The process of claim 1, wherein the product polyimide aerogel has surface area in excess of 500 $m^2/g$, a mesoporous pore size of between about 5 nm and about 100 nm, and a narrow pore size distribution.

6. The process of claim 1, wherein the product polyimide aerogel has surface area in excess of 1000 $m^2/g$, mesoporous pore size of between about 5 nm and about 100 nm, and a narrow pore size distribution.

7. A process of producing a carbon aerogel comprising the steps of
    contacting a diamine monomer and an aromatic dianhydride monomer in a first solvent under conditions conducive to formation of a poly(amic acid)), wherein the diamine monomer is an aromatic diamine, an aliphatic diamine, a bis(ω-aminoalkyl)terminated polysiloxane or a combination thereof;
    contacting the poly(amic acid) in said first solvent with a chemical dehydrating agent to form a polyimide by imidization;
    drying the polyimide gel in the presence of supercritical $CO_2$ to afford an polyimide aerogel; and
    pyrolyzing the polyimide aerogel under in an inert atmosphere to form a carbon aerogel, wherein the carbon aerogel further comprises between about 0.01% and about 15% nitrogen by weight.

8. The process of claim 7 in which the first solvent is not miscible with supercritical $CO_2$, the method further comprises the step of exchanging the first solvent with a second solvent which is miscible with supercritical $CO_2$ prior to drying the polyimide gel.

9. The process of claim 7 in which the process further comprises post-curing the polyimide aerogel at a temperature of between about 50° C. and about 450° C. before or after supercritical $CO_2$ drying.

10. The process of claim 7, wherein the chemical dehydrating agent is a mixture of an alkanoic anhydride and an organic base selected from optionally substituted pyridines and optionally substituted trialkyl amines.

11. The process of claim 7, wherein the product carbon aerogel has surface area in excess of 400 $m^2/g$, a mesoporous pore size of between about 5 nm and about 100 nm, and a narrow pore size distribution.

12. The process of claim 7, wherein the product carbon aerogel has surface area between about 500 $m^2/g$ and about 1200 $m^2/g$, a mesoporous pore size of between about 5 nm and about 100 nm, and a narrow pore size distribution.

13. The process of claim 7, wherein the composition of the carbon aerogel comprises up to about 9% nitrogen by weight at a pyrolysis temperature of 700° C. or up to about 6.5% nitrogen by weight at a pyrolysis temperature of 900° C.

14. The process of claim 1 or claim 7, wherein a reinforcing agent is added to the polyimide wet gel before drying with supercritical $CO_2$.

15. The process of claim 14, wherein the reinforcing agent is selected from a reinforcement pad, organic or inorganic fibers carbon nanotubes, metallic fillers or particles or inorganic fillers or particles.

16. The process of claim 14, wherein the fiber reinforcement pad is selected from a non-woven or woven fiber reinforcement composed of a polymeric organic fiber, a glass fiber, a ceramic fiber, a carbon precursor fiber, or a biopolymer fiber.

17. The process of claims 1 or claim 7, in which the process further comprises a post-curing step, at an elevated temperature, to induce substantially complete imidization, wherein the post curing step is conducted:

(a) prior to the solvent removal step wherein the post-curing step is conducted under a pressure of about 20 psi to about 4000 psi; or

(b) after the solvent removal step, wherein the post-curing step is conducted under an inert atmosphere or in a vacuum at a temperature of between about 50° C. to about 450° C.

18. The process of claim 1 or claim 7, wherein the diamine monomer is an aliphatic diamine containing a linear alkyl chain unit of formula wherein n is a integer number from 1 to 12.

19. The process of claim 1 or claim 7, wherein the diamine monomer is an amino terminated polysiloxane of the formula wherein $R_1$ and $R_2$ are each independently selected from the group consisting of hydrogen, optionally substituted alkyl, optionally substituted alkenyl, optionally substituted alkynyl, optionally substituted cycloalkyl, optionally substituted cycloalkyl-alkyl, optionally substituted aryl, optionally substituted aralkyl, and optionally substituted alkoxy; and x is between about 32 to about 44.

20. The process of claim 19, wherein the amino terminated polysiloxane is a thermally stable polysiloxane of the formula wherein $R_1$ and $R_2$ are independently selected from optionally substituted alkyl having from 1 to about 12 carbon atoms and optionally substituted phenyl; and x is between 32 and 44.

21. The process of any claim 1 or claim 7, wherein the aromatic dianhydride is monomer represented by either formula III or IV wherein X and Y are monofunctional substituents selected from hydrogen, halogen, carboxyl, alkyl, and alkoxy groups, X and Y may be the same or different substituents and A is a bivalent connecting group selected from —O—, —S—, —CO—, —S—, —$SO_2$—, —$CH_2$—, or A is a single bond.

22. The process of claim 21, wherein the aromatic dianhydride is selected from the group consisting of optionally substituted pyromellitic dianhydride, optionally substituted 3,3',4,4'-biphenyltetracarboxylic dianhydride, optionally substituted 3,3'4,4'-benzophenone tetracarboxylic dianhydride, and optionally substituted 2,3,6,7-naphthylene tetracarboxylic acid dianhydride.

23. The process of claim 1 or claim 7, wherein the dehydrating agent comprises at least one compound selected from the group consisting of acetic anhydride, propionic anhydride, n-butyric anhydride, benzoic anhydride, trifluoroacetic anhydride, and phosphous trichloride.

24. The process of claim 1 or claim 7, wherein the organic base is selected from optionally substituted mono-, di- and trialkylamines, optionally substituted pyridines, optionally substituted isoquinoline, optionally substituted morpholine, optionally substituted piperadine, and optionally substituted piperazine.

25. A polyimide aerogel consisting essentially of at least one polyimide polymer is a polyimide of the formula:

wherein represents an optionally substituted aryl group, an optionally substituted alicyclic group, an optionally substituted heteroaryl group, or an optionally substituted heteroalicyclic group;
R is an difunctional optionally substituted alkylene, optionally substituted difunctional alicyclic hydrocarbon group, or a combination thereof; and
x is a number greater than about 2.

26. A polyimide aerogel of claim 25, having a density of 0.3 g/cc or less.

27. A polyimide aerogel of claim 26 wherein the aerogel density is between 0.01 and 0.2 g/cc.

28. A polyimide aerogel of claim 25, having a yield strength of about 1 MPa or more.

29. A polyimide aerogel of claim 25, having a surface area of more than about 400 $m^2/g$.

30. A polyimide aerogel of claim 29 having a surface area of between about 500 and about 1200 $m^2/g$.

31. A polyimide aerogel of claim 25, having an average pore size of between about 1 to about 100 nm.

32. A polyimide aerogel of claim 31 having an average pore size of between about 10 and 40 nm.

33. A polyimide aerogel of claim 25 according to the formula wherein represents an optionally substituted aryl group, an optionally substituted alicyclic group, an optionally substituted heteroaryl group, or an optionally substituted heteroalicyclic group;
R is a difunctional optionally substituted alkylene group; and
x is a number greater than about 2.

34. A polyimide aerogel of claim 33, wherein represents phenyl or biphenyl;
R represents $C_{1-12}$alkylene; and
x is a number greater than about 5.

35. An article of manufacture comprising at least one aerogel selected from polyimide aerogels of claim 25 or carbon aerogels comprising carbon and nitrogen, each of which may have metal particles dispersed in the pores of the aerogel.

36. The article of manufacture of claim 35, wherein the aerogel is a polyimide aerogel provided by claim 25.

37. An electrode composed of at least one aerogel selected from carbon aerogels comprising carbon and nitrogen which has metal particles dispersed in the pores of the aerogel.

38. An electrochemical cell comprising one or more electrodes composed of at least one aerogel selected from carbon aerogels comprising carbon and nitrogen which has metal particles dispersed in the pores of the aerogel.

39. An electrochemical cell of claim 38, wherein the electrochemical cell is selected from a battery, a capacitor, a supercapacitor, fuel cell, or capacitive deionization cell.

40. A supported metal catalyst comprising a carbon aerogel comprising carbon and nitrogen having metal particles dispersed therein.

41. The polyimide aerogel of claim 25, further consisting essentially of a reinforcing agent.

42. The polyimide aerogel of claim 41, wherein the reinforcing agent is selected from a reinforcement pad, organic or inorganic fibers carbon nanotubes, metallic fillers or particles or inorganic fillers or particles.

43. The polyimide aerogel of claim 41, wherein the fiber reinforcement pad is selected from a non-woven or woven fiber reinforcement composed of a polymeric organic fiber, a glass fiber, a ceramic fiber, a carbon precursor fiber, or a biopolymer fiber.

* * * * *